Sept. 5, 1939.   A. F. REHNBERG   2,172,145
ROLLER BEARING ASSEMBLING AND LUBRICATING MACHINE
Filed Aug. 31, 1936   3 Sheets-Sheet 1
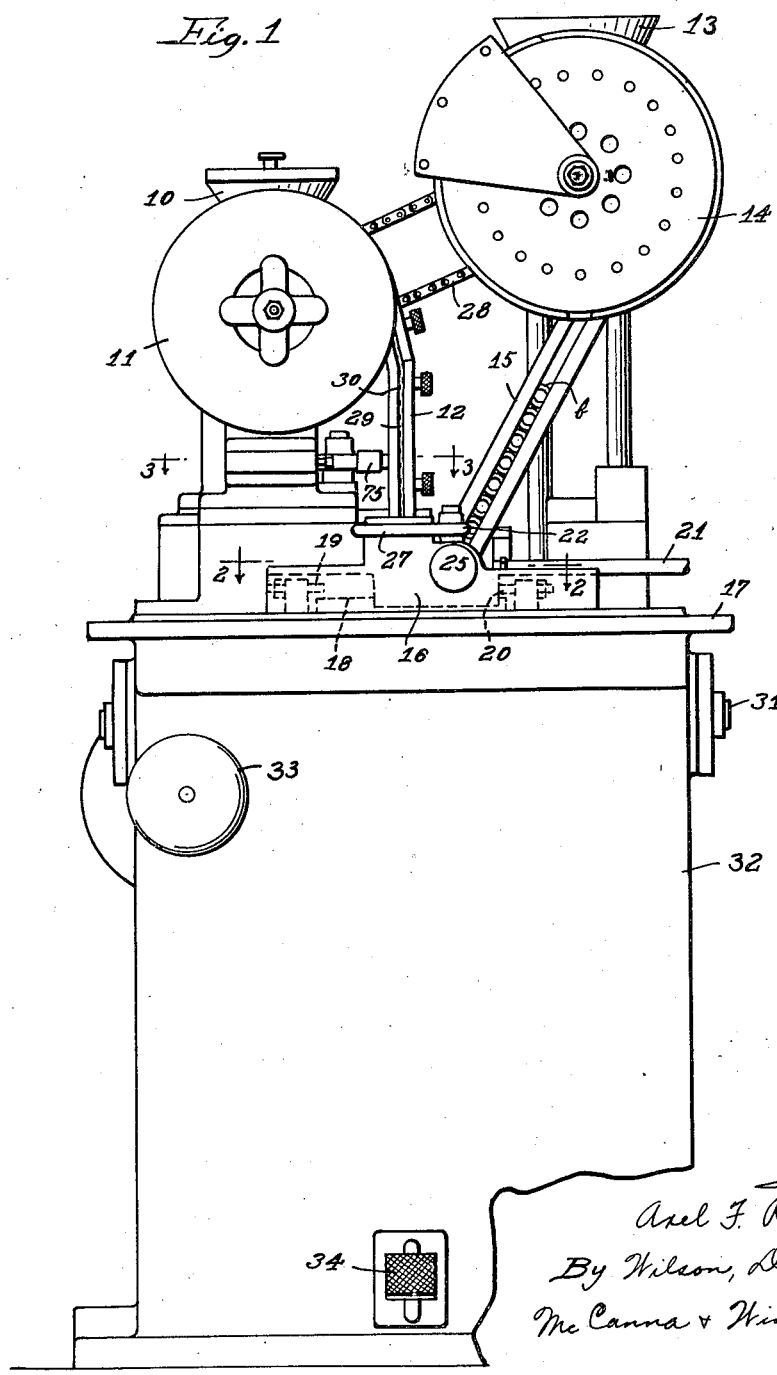

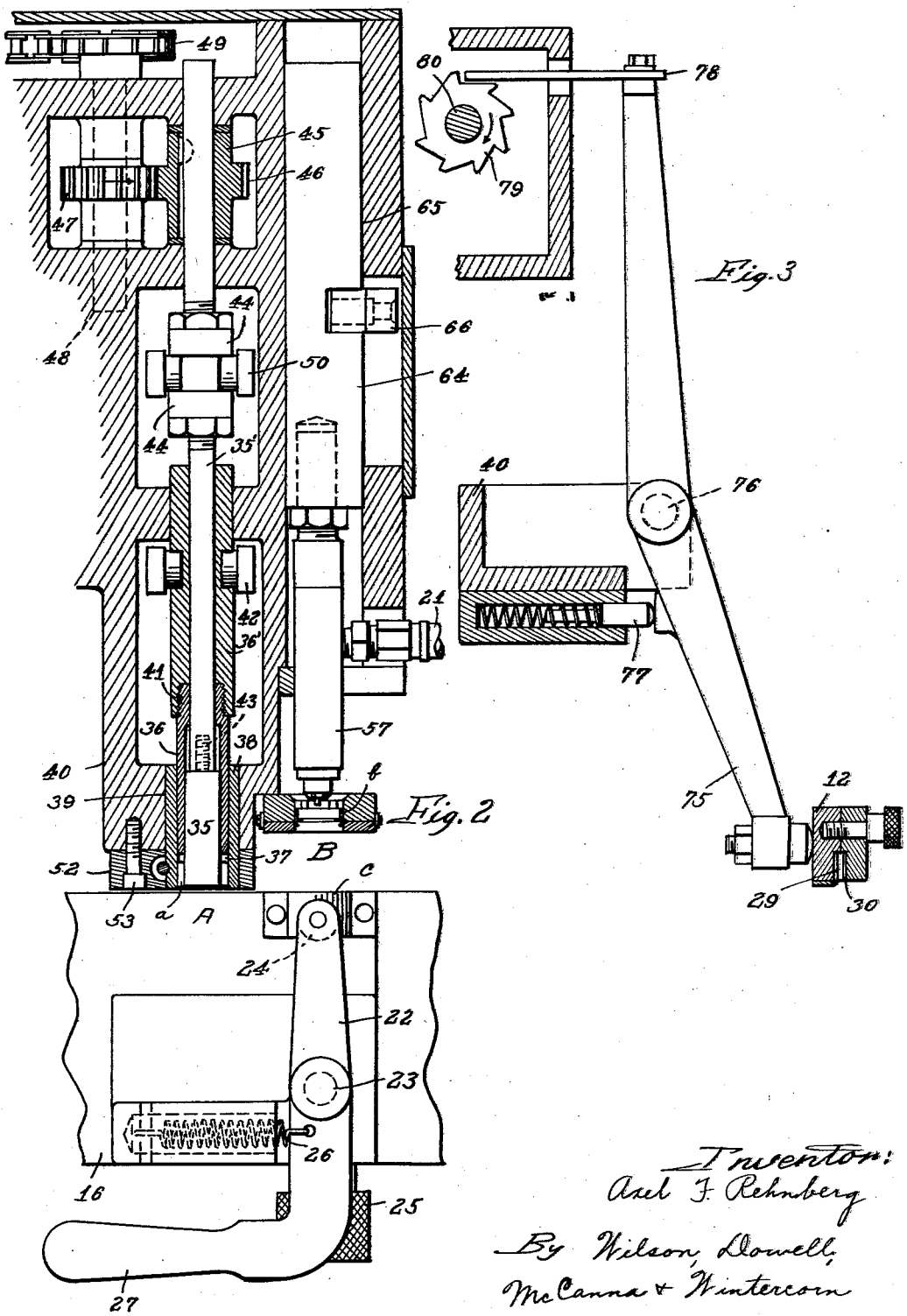

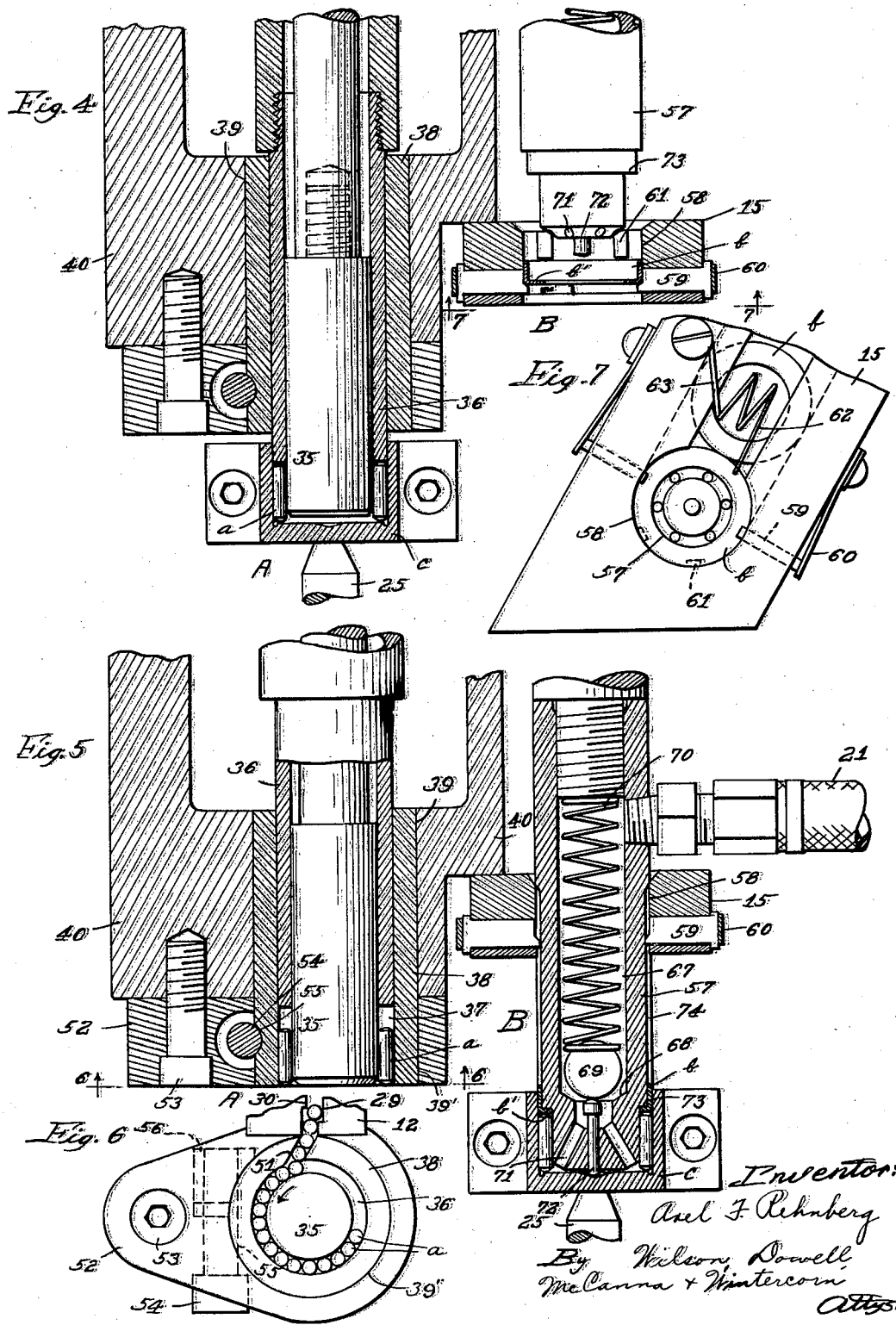

Patented Sept. 5, 1939

2,172,145

UNITED STATES PATENT OFFICE 2,172,145

ROLLER BEARING ASSEMBLING AND LUBRICATING MACHINE

Axel F. Rehnberg, Rockford, Ill., assignor, by mesne assignments, to Borg-Warner Corporation, Chicago, Ill., a corporation of Illinois Application August 31, 1936, Serial No. 98,678

13 Claims. (Cl. 29—84)

This invention relates to a machine for assembling and lubricating roller bearings and the like.

The principal object of my invention is to provide a machine of simple and compact design for assembling the rollers in a cup-shaped bearing and thereafter applying a retainer ring and simultaneously injecting lubricant into the bearing.

In the machine of my invention, a complete circle of rollers is inserted into the bearing so that the rollers are "keystoned" in place. Since the rollers are fed downwardly to the assembling chamber by gravity through a stationary zigzag chute, I prefer to provide means for jarring the chute at intervals to prevent jamming of rollers therein, this being accomplished through a simple hammer action operated by a ratchet wheel driven continuously in the operation of the machine. I also provide in the assembling chamber a smooth cylindrical pilot horizontally disposed beneath the chute and driven continuously in one direction so as to take the rollers as they enter the chamber one by one and by frictional engagement therewith roll them forwardly in the direction of rotation of the pilot until a complete circle of rollers has been collected, whereupon the group turns as a unit and no more rollers can enter. This greatly simplifies the mechanism because it eliminates the problem of disposing of excess rollers while at the same time definitely insuring the assembling of a complete set in each bearing.

Another important feature of the present machine is the use of a hollow plunger or ram for pressing the retainer rings into the bearings and at the same time conducting lubricant under pressure into the bearings. In this way, while the plunger is inserted, the retainer ring seals the bearing against escape of lubricant around the plunger, and since the plunger is equipped with a check valve which seats automatically in the withdrawal of the plunger, loss of lubricant is prevented.

Still another important feature consists in the provision of means whereby the machine may be quickly and easily changed to permit assembling different sizes of bearings.

The invention is hereinafter described by reference to the accompanying drawings, in which—

Figure 1 is a front view of an assembling machine made in accordance with the invention;

Figs. 2 and 3 are horizontal sections on a somewhat enlarged scale taken approximately in the planes of the lines 2—2 and 3—3 of Fig. 1;

Figs. 4 and 5 are further enlarged sections corresponding to a portion of Fig. 2, Fig. 4 showing the pilot and associated sleeve in place in a bearing into which a set of rollers has just been inserted, and Fig. 5 showing the hollow plunger at the other station in place in the bearing into which the rollers were previously inserted, the plunger serving to press a retainer ring into place in the bearing and at the same time injecting lubricant therein, and Figs. 6 and 7 are front views of the roller assembling mechanism and retainer ring assembling mechanism, respectively, taken on the lines 6—6 and 7—7 of Figs. 5 and 4, respectively.

The same reference numerals are applied to corresponding parts throughout the views.

Before proceeding with the detailed description of the present machine, it should be understood that while the plain cylindrical rollers $a$ and flanged retainer rings $b$ are herein described and illustrated as assembled in cup-shaped bearing blocks $c$ of a type designed for use on the trunnions of trunnion type universal joints, it should be understood that the invention is not to be regarded as limited to this or any other specific type of bearings, rollers, or retainer rings. Furthermore, while I prefer to lubricate the bearings in the assembling thereof, so that the bearings are ready for use without any further attention, it should be understood that the invention is not to be regarded as limited in that respect.

This machine is an improvement upon that disclosed in my U. S. Letters Patent No. 2,057,692, issued October 20, 1936, and, like that machine, has a hopper 10 from which rollers $a$ are dispensed by the rotation of a disk 11 and delivered through a chute 12 to the assembling point, while at the same time retainer rings $b$ dispensed from a hopper 13 in the rotation of a disk 14 are delivered through another chute 15 for assembly on the bearings containing the rollers $a$. In the machine of the earlier application, just mentioned, the retainer ring and rollers were assembled in the bearing at one station, but in the present machine there is a slidable work carrier 16 movable laterally on the table 17 on ways 18 from the stop 19 to the stop 20 to bring the bearing $c$ from one station A adjacent the lower end of the chute 12 where the rollers $a$ are inserted into the bearing, as illustrated in Fig. 4, to another station B where the retainer ring $b$ is pressed into the bearing, as illustrated in Fig. 5. This two-step assembling permits the injection of a charge of lubricant into the bearing preferably in the same operation when the retainer ring is pressed into place, the lubricant being supplied suitably from a pressure tank through a flexible conduit 21. The bearings are mounted singly upon the carrier 16 in any suitable or preferred manner, Fig. 2 showing a clamp member 22 pivoted at 23 on the carrier and equipped with a cam 24 on its forward end which in the clockwise movement of the member 22 about the pivot 23 serves to clamp the bearing c in place in front of the backing screw 25. The latter is threaded in the carrier 16 and has a knurled head which permits one to back the screw away from a bearing and remove the bearing readily if a jam should occur. A coiled tension spring 26 normally urges the clamp 22 toward operative position, and there is a handle 27 on the clamp, which, when pulled forwardly with respect to the table 17, serves to disengage the clamp and permit removal of the bearing. So much for a general understanding of the machine to which my invention relates. The roller feed mechanism 10—11 may be of the form disclosed in U. S. Letters Patent No. 2,088,117, issued July 27, 1937. There is therefore no need for any illustration of the details of this mechanism here, and it will suffice to state that the rotating parts 11 and 14 are interconnected suitably by the chain, indicated at 28, so as to operate in unison. The roller chute 12 provides a zigzag passage 29 therein by reason of the spaced projections 30 disposed in staggered relation on the opposite sides of the chute, as fully described in U. S. Letters Patent No. 2,105,929, issued January 18, 1938, where it is explained that these projections striking each roller as it comes down through the chute keeps the same in substantial parallelism with other rollers all of the way down, so that the rollers discharged from the chute into the assembling chamber will be properly disposed and may be quickly and easily grouped for insertion into a bearing. In view of the disclosure in my Patent No. 2,057,692 of the complete power transmission mechanism for driving the feed mechanisms and a main cam shaft corresponding to the shaft indicated at 31 in this case, there is no need for a complete disclosure of the mechanism in the base 32, and it should suffice to state that the machine may be operated by hand by turning the wheel 33, as, for example, when setting the machine before starting power operation, and that when the treadle 34 is depressed, a single action clutch operatively associated with the shaft 31 will cause only one complete cycle of movements of the proper parts when the carrier 16 is at station A and likewise when it is at station B through the medium of the cams on the shaft 31. The shaft 31 makes a half-revolution when the carrier 16 is at station A and another half-revolution when the carrier is at station B.

Referring now more particularly to Fig. 2, and also to Figs. 4 and 5, it will be observed that at station A there is an assembling pilot 35 and associated sleeve 36. The pilot 35 is cylindrical and horizontally disposed in substantially concentric relation to the assembling chamber 37 provided in the forward end of a bushing 38 mounted in the horizontal bore 39 in the frame 40. The sleeve 36 is reciprocable in the bushing 38 from the retracted position shown in Figs. 2 and 5 to the position shown in Fig. 4, where it projects through and out of the chamber 37 and is entered in the open end of the bearing c to enter the rollers a therein. The sleeve 36 threads, as at 41, into a holder 36' which is operable to and fro by a yoke 42 arranged to be operated in any suitable manner by a cam on the shaft 31, previously mentioned. The pilot 35 has a reduced threaded portion 43 threaded into the end of the rod 35' which extends rearwardly through the holder 36' and through a pair of collars 44 for a sliding driving connection with the elongated hub 45 of a gear 46 meshing with another gear 47 on a shaft 48 suitably supported in the frame 40 and arranged to be continuously driven by the chain and sprocket, indicated at 49. A yoke 50 cooperating with the collars 44 on the rod 35' serves to communicate reciprocatory movement to the pilot 35 during the continuous rotation thereof. The yoke 50, similarly to the yoke 42, is arranged to be operated in any suitable way by a cam on the shaft 31, and, as will presently appear, the yokes 42 and 50 are operated in a certain timed relationship to give the desired timing in the movement of the sleeve 36 with relation to the pilot 35. The gear 47 is driven in the direction of the arrow shown in Fig. 2, in order to secure counterclockwise turning of the pilot 35, as indicated by the arrow in Fig. 6. Now, as shown in Fig. 6, the lower end of the zigzag passage 29 in the chute 12 communicates with an inclined slot 51 provided in the front end of the bushing 38 so that rollers a leaving the passage 29 pass through the slot 51 and enter the assembling chamber 37. The rollers as they enter the chamber come to rest on the pilot 35, which, as stated before, is turning continuously in a counterclockwise direction. As a result, the rollers are caused to roll around the inside of the bushing 38, one after the other, in a continuous arc around the pilot 35. In that way, a complete circle of rollers is collected, whereupon no more rollers will be permitted to enter the chamber and the group of rollers in the chamber will simply revolve past the lowest roller in the slot 51. The fact that the pilot has a smooth cylindrical surface permits this frictional drive, and also permits of a certain amount of slippage between the pilot and the rollers in the turning of the pilot relative to the rollers, which, of course, is unobjectionable. The principal advantage of this assembling mechanism is its simplicity and the fact that it eliminates any need for special means to accommodate excess rollers that cannot enter the assembling chamber.

In operation, while one bearing block c is at station B for the final assembling operation, hereinafter described, and while that block is being removed after the assembling operation and another block is being substituted, the pilot 35 collects a group of rollers a in the assembling chamber 37 in the manner above described, and the group is in readiness for insertion into the block when the block is moved to station A. Then, as illustrated in Fig. 4, the pilot 35 and sleeve 36 are moved forward from the position shown in Figs. 2 and 5, to enter the group of rollers into the bore of the bearing block. Then the pilot 35 is retracted and after that the sleeve 36 is retracted, thus leaving the group of rollers in the bearing block, "keystoned" in place against inward displacement relative to one another. When the sleeve has been retracted, the pilot and sleeve are then in the position shown in Fig. 5, and, of course, the grouping of another set of rollers commences, the rollers being free to enter the assembling chamber from the slot 51 just as soon as the sleeve 36 is fully retracted. In passing, it may be mentioned that the pilot 35 can be unthreaded at 43 and the sleeve 36 can be unthreaded at 41 to permit substitution of larger or smaller sized parts according to the size of bearing to be assembled and the size of the rollers to be used. The bushing 38 is also easily removable from the bore 39, for the same purpose. The plate 52 fastened by the screw 53 to the frame 40 has the end of the bushing 38 entered in a hole 39' provided therein registering with the bore 39, and when a new bushing has been entered through the hole, a screw 54 entered in the plate 52 passes through a groove 55 provided in the side of the bushing, and is threaded into a nut 56 and tightened so as to hold the bushing against movement endwise or rotationally and keeps the slot 51 in the bushing in register with the passage 29.

At station B I provide a hollow plunger or ram 57 disposed horizontally and substantially concentric with a semi-circular depression 58 provided in the lower end of the chute 15, where the lowermost ring $b$ comes to rest, as shown in Fig. 7. The stack of rings in the chute has sufficient weight to press the lowermost roller $b$ into snug engagement with the sides of the depression 58. Spring pressed plungers 59 actuated by leaf springs 60 exert slight pressure against the lowermost ring from diametrically opposite sides to hold the same in a vertical plane, and there are also several projections 61 in the depression 58 behind the ring to prevent its getting cocked out of proper position. A finger 62 formed by the end of a coiled spring 63 suitably secured on the front of the chute 15 at its lower end has sufficient engagement with the edge of the ring from the front to prevent cocking of the ring out of position in that direction, but at the same time permits the forward movement of the ring with the plunger 59, as hereinafter described, the finger 62 and the springs 60 being arranged to give readily when the ring is forcibly expelled from the depression 58. The plunger 57 is carried on the front end of a slide 64 movable forwardly and rearwardly in a guide 65 provided therefor in the frame 40. This slide is operable by an arm 66 operated in any suitable way by a cam on the shaft 31. The plunger 57 has a bore 67 communicating with the flexible conduit 21 previously mentioned, whereby lubricant under pressure is continuously delivered to said plunger. A valve seat 68 at the front end of the bore 67 cooperates with a ball check valve 69 held in place by a coiled compression spring 70, whereby to seal the plunger against leakage of lubricant through the ports 71 provided in the end of the plunger. The ball 69, however, is arranged to be unseated by a pin 72 when the plunger 57 is inserted into a bearing block $c$, as shown in Fig. 5, whereby to permit the discharge of lubricant under pressure into the bearing. Now, an annular shoulder 73 on the plunger 57 is arranged to engage the flange $b'$ of the ring $b$ as the plunger 57 moves forwardly through the depression 58, whereby to eject the ring from the depression and carry the ring forward with the plunger and press it home into the open end of the bearing bore, substantially as shown in Fig. 5. In that way, the ring $b$ is made to serve as a seal around the plunger 57 to prevent escape of lubricant from the bearing when the valve 69 is unseated. The ring $b$ enters the bearing bore at about the same time or slightly after the pin 72 encounters the closed end of the bore and unseats the valve 69. In that way there is insured an ample opportunity for the discharge of enough lubricant into the bearing. The pin 72 allows the valve 69 to seat again just as soon as the plunger 57 has commenced its retracting movement, so that no lubricant will be wasted and the machine will not be messed up by drippage. In passing, it will be seen that the reduced ends of the plungers 59 enter longitudinal grooves 74 in the opposite sides of the plunger 57 after they have allowed the ring $b$ to pass the same in the forward movement of the plunger 57, and in that way any ring left on the plunger in an idle stroke forward and back will be stripped off and allowed to fall onto the table 17.

In the operations at stations A and B, the carrier 16 is preferably arranged to be moved by power from one station to the other at the commencement of power application after the treadle 34 has been depressed. That is, assuming the carrier is at station B, as in Fig. 1, and has just been supplied with a bearing block $c$, if the treadle is depressed, the carrier is first moved to station A and then the pilot 35 and sleeve 36 will move forward to enter the rollers $a$ into the block. After that operation is completed, the operator presses the treadle again, and the carrier first moves from station A to station B and then the plunger 57 moves forward to press the retainer ring $b$ into the block and also inject lubricant. This power operation of the carrier eliminates danger of rollers being discharged without a bearing block being in place to receive the same, as well as the danger of a retainer ring being discharged under like conditions. The only way either of these things could happen would be if the operator failed to place a bearing block on the carrier, and depressed the treadle.

In conclusion, attention is called to Figs. 1 and 3 showing a horizontally disposed trip hammer 75 which is pivoted at 76 on the frame 40 and urged normally toward the chute 12 under the action of a spring-pressed plunger 77 but is moved positively in the opposite direction away from the chute 12 by a push rod 78 which engages a ratchet wheel 79 arranged to turn continuously in a clockwise direction, as indicated by the arrow, with a shaft 80. The latter is suitably connected with the same drive means as the pinion 47 so as to be driven continuously and accordingly cause repeated jarring of the chute 12 at regular intervals during the operation of the machine. This will prevent the jamming of rollers in the chute, because the moment any tendency to jam occurs, the next hammer blow will be sufficient to jar loose the lowermost roller of the group that has jammed and allow the group to pass down through the zigzag passage 29 by gravity.

It is believed the foregoing description conveys a good understanding of the objects and advantages of my invention. The appended claims have been drawn with a view to covering all legitimate modifications and adaptations.

I claim:

1. In a roller bearing assembling machine, a frame, a cylindrical pilot, a rod on the end of which said pilot is removably secured arranged to reciprocate said pilot, a sleeve slidable on said pilot, a collar on said rod having said sleeve removably secured thereon and arranged to reciprocate the same, means for reciprocating said rod and collar in timed relation to one another, said pilot and sleeve being removable so as to permit substitution of another interfitting pilot and sleeve of a different size for assembling different sized bearings, a bushing removably mounted in an opening provided therefor in said frame in concentric relation to said pilot and sleeve, whereby to provide an assembling chamber around said pilot, said bushing being removable so as to permit substitution of another bushing of different internal size for assembling different sized bearings, and means for feeding rollers into said assembling chamber.

2. In a roller bearing assembling machine, a frame, a cylindrical pilot, a rod on the end of which said pilot is removably secured arranged to reciprocate said pilot, a sleve slidable on said pilot, a collar on said rod having said sleeve removably secured thereon and arranged to reciprocate the same, means for reciprocating said rod and collar in timed relation to one another, said pilot and sleeve being removable so as to permit substitution of another interfitting pilot and sleeve of a different size for assembling different sized bearings, an assembling chamber in said frame providing walls in spaced concentric relation to said pilot, and means for feeding rollers into said chamber around the pilot.

3. In a roller bearing assembling machine, a frame, a cylindrical pilot, a sleeve slidable thereon, means for reciprocating said pilot and sleeve in timed relation to one another, a bushing removably mounted in an opening provided therefor in said frame in concentric relation to said pilot and sleeve, whereby to provide an assembling chamber around said pilot, said bushing being removable so as to permit substitution of another bushing of different internal size for assembling different sized bearings, and means for feeding rollers into said assembling chamber.

4. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, a holder for supporting a retainer ring in coaxial relation to said plunger, means for feeding retainer rings to said holder, and means for moving said plunger axially whereby to apply the ring in the holder onto the bearing member so as to retain the rollers therein.

5. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, a holder for supporting a retainer ring in coaxial relation to said plunger, means for feeding retainer rings to said holder, means for moving said plunger axially whereby to apply the ring in the holder onto the bearing member so as to retain the rollers therein, said plunger being hollow and having one or more ports provided in the end thereof, and means for supplying lubricant to said plunger under pressure whereby to lubricate said bearing member.

6. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, a holder for supporting a retainer ring in coaxial relation to said plunger, means for feeding retainer rings to said holder, means for moving said plunger axially whereby to apply the ring in the holder onto the bearing member so as to retain the rollers therein, said plunger being hollow and having one or more ports provided in the end thereof, means for supplying lubricant to said plunger under pressure whereby to lubricate said bearing member, a valve controlling discharge of lubricant from said ports, and means for automatically opening said valve when the plunger enters the bearing member and closing the same when the plunger withdraws.

7. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, a holder for supporting a retainer ring in coaxial relation to said plunger, means for feeding retainer rings to said holder, means for moving said plunger axially whereby to apply the ring in the holder onto the bearing member so as to retain the rollers therein, said plunger being hollow and having one or more ports provided in the end thereof, means for supplying lubricant to said plunger under pressure whereby to lubricate said bearing member, and valve means controlling the discharge of lubricant from said ports.

8. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, said plunger being hollow and having one or more ports provided in the end thereof, and means for supplying lubricant to said plunger under pressure whereby to lubricate said bearing member.

9. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, said plunger being hollow and having one or more ports provided in the end thereof and means for supplying lubricant to said plunger under pressure whereby to lubricate said bearing member, a valve controlling discharge of lubricant from said ports, and means for automatically opening said valve when the plunger enters the bearing member and closing the same when the plunger withdraws.

10. In a roller bearing assembling machine, a reciprocable pilot, an assembling chamber providing walls in spaced relation thereto, means for feeding rollers thereto so as to form a circular group of rollers around the pilot, means for moving said pilot axially to transfer said grouped rollers from said chamber to a bearing member, a plunger in spaced parallel relation to said pilot, a movable carrier for the bearing member movable transversely between the pilot and plunger to position the bearing member in coaxial relation to either, said plunger being hollow and having one or more ports provided in the end thereof, and means for supplying lubricant to said plunger under pressure whereby to lubricate said bearing member, and valve means controlling the discharge of lubricant from said ports.

11. In a device of the character described, a support for a cup-shaped bearing member, a hollow lubricator in substantially coaxial relation to the bearing member on said support, the support and lubricator being relatively movable to enter said lubricator in said bearing member, said lubricator having one or more ports in the end portion thereof adapted to enter said bearing member, whereby to discharge lubricant therein, means for supplying lubricant under pressure to said lubricator, a spring-pressed check valve in the end portion of said lubricator serving normally to seal the same against escape of lubricant, and a valve operator projecting from the end of said lubricator and arranged to engage the end wall of said cup-shaped bearing member when said lubricator enters the same, whereby to open said valve.

12. In a machine of the class described, a support for a cup-shaped bearing member, a hollow plunger in substantially concentric relation to said bearing member and reciprocable into and out of the latter, a support for a retainer ring between said bearing support and plunger, said plunger being formed to engage a ring on said support in its movement into said bearing member, whereby to move said ring to said bearing member and apply the same thereto, said plunger having one or more ports in the end portion thereof adapted to enter said bearing member, whereby to discharge lubricant therein, means for supplying lubricant under pressure to said plunger, a spring-pressed check valve in the end portion of said plunger serving normally to seal the same against escape of lubricant, and a valve operator projecting from the end of said plunger and arranged to engage the end wall of said cup-shaped bearing member when said plunger enters the same, whereby to open said valve.

13. In a machine of the class described, a plunger, a bearing support arranged to hold a bearing in substantially coaxial relation to said plunger, means to reciprocate the plunger, a support for releasably holding a ring to be applied to the bearing, and one or more spring-pressed plungers on said ring support in transverse relation to the first plunger and engaging the ring frictionally on the periphery and projecting in front of the ring to prevent accidental displacement of the ring or movement thereof out of a plane normal to the first plunger, said first plunger being formed to engage and move said ring forcibly off said spring-pressed plungers and convey the same to the bearing and apply the same thereto, said spring-pressed plungers serving thereafter as stripper means to remove the ring from the first plunger in the return movement thereof in the event the ring returns with the first plunger.

AXEL F. REHNBERG.